ical Cl. # United States Patent [19]

Wetterhorn et al.

[11] Patent Number: 4,501,152
[45] Date of Patent: Feb. 26, 1985

[54] TEMPERATURE COMPENSATOR FOR LIQUID FILLED PRESSURE GAUGE

[75] Inventors: Richard H. Wetterhorn, Fairfield; Walter J. Ferguson, Middlebury, both of Conn.

[73] Assignee: Dresser Industries, Inc., Dallas, Tex.

[21] Appl. No.: 473,829

[22] Filed: Mar. 9, 1983

[51] Int. Cl.³ ........................ G01L 19/14; G01P 1/02
[52] U.S. Cl. ........................................ 73/738; 73/431
[58] Field of Search ............... 73/738, 708, 300, 715, 73/706, 431; 92/98 R, 98 D

[56] References Cited

U.S. PATENT DOCUMENTS

| 2,693,896 | 11/1954 | Brown | 220/44 |
| 3,938,393 | 2/1976 | Mogensen et al. | 73/431 |
| 4,051,730 | 10/1977 | Andrews et al. | 73/738 |

FOREIGN PATENT DOCUMENTS 2249266  4/1974  Fed. Rep. of Germany .

OTHER PUBLICATIONS

Manning, Maxwell & Moore Dwg., 56C117, 1965-Item #28.
Dresser Industries, Inc., Dwg. WJF-004-Wika Gauge Construction Model 233.33, 1982-FIGS. 1 and 3.

Primary Examiner—Donald O. Woodiel
Attorney, Agent, or Firm—Daniel Rubin

[57] ABSTRACT

A liquid filled pressure gauge in which temperature induced volumetric changes imposed on the liquid fill are compensated for by a tensioned flexible diaphragm secured in a pressure-tight spaced relation on a cover plate for the gauge casing. For receiving the diaphragm pre-tensioned, the cover includes an annulus extending laterally from the cover surface with a negative draft on its circumference. By virtue of the diametral relationship between the outside diameter of the diaphragm about the draft surface of the annulus and the internal diameter of the case opening, the diaphragm incurs a friction fit as the cover is emplaced causing diaphragm tension to be increased.

5 Claims, 5 Drawing Figures

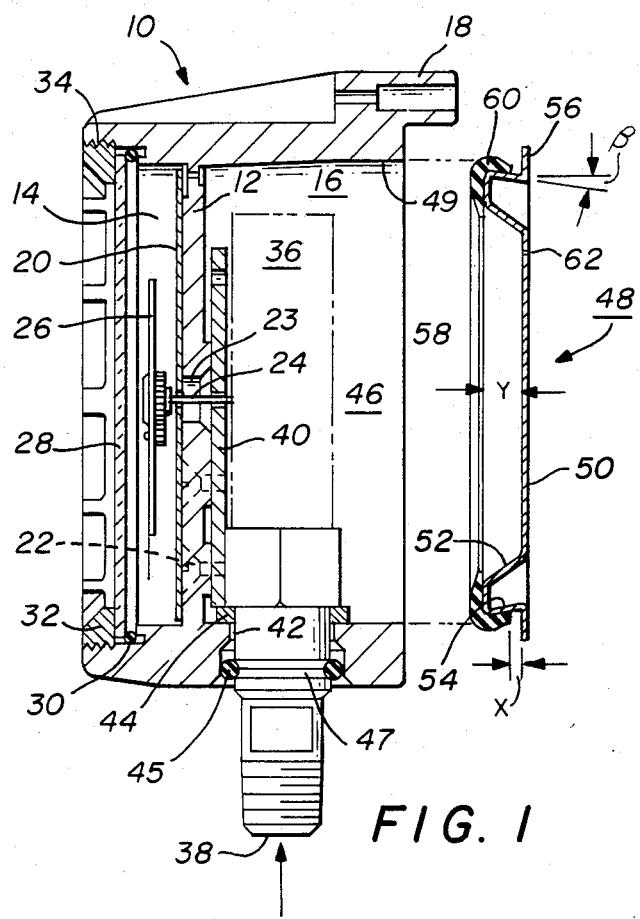
FIG. 1
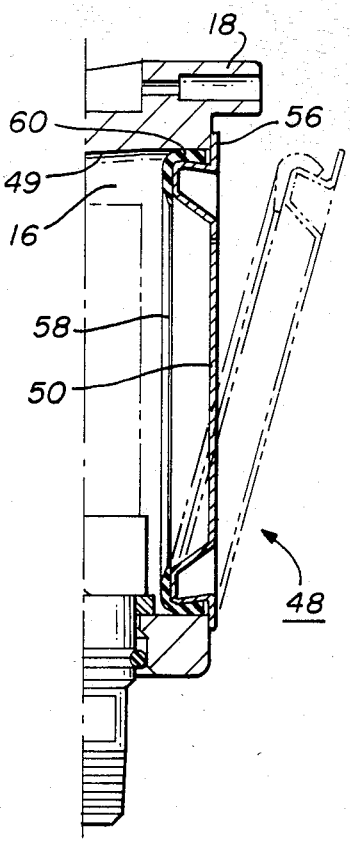
FIG. 2
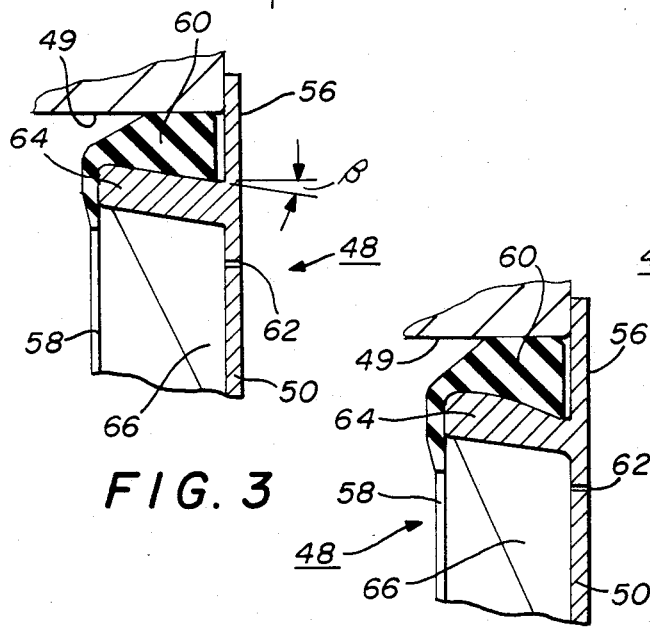
FIG. 3
FIG. 4
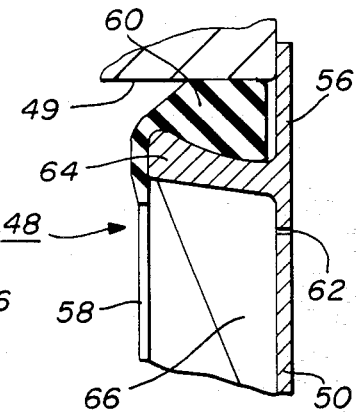
FIG. 5

TEMPERATURE COMPENSATOR FOR LIQUID FILLED PRESSURE GAUGE

BACKGROUND OF THE INVENTION

1. The field of art to which the invention pertains includes the art of measuring and testing as directed to fluid pressure gauges having fluid pulsation dampening.

2. Gauge instruments and particularly pressure gauges or the like containing an oil fill have been widely used and are commercially available from a variety of manufacturing sources. Specific reasons vary for selecting or requiring an oil filled gauge versus a dry or unfilled gauge but generally are attributed to either protecting the working mechanism against corrosion and/or system vibration or pulsation to which the instrument is subjected. Prior art exemplifying gauges of this sort are disclosed in U.S. Pat. Nos. 2,773,388; 3,080,758; 3,370,470; 3,712,138; 3,874,241; 3,938,393; 3,990,306; 3,701,284, and 4,214,466.

Inherent in the liquid fill constructions is the obvious added requirement for a leak-tight enclosure while incorporating a breathing capability to the casing. That is, in order to accommodate volumetric changes of a liquid fill from excursions of temperature and/or barometric pressure in the casing environment, a form of breathing vent aperture or other compensation is required to avoid adversely affecting accuracy of the instrument. Moreover, constructions of solid front casings are largely governed by the American National Standard Institute (ANSI) Standard B40.1-1974, Section 3.1.1.2 requiring that the back construction of a solid front gauge be capable of relieving case pressure buildup from within.

A problem associated with liquid filled constructions is the desirability to minimize case depth while providing both adequate compensation volume and pressure relieving capability in the event excessive overpressure is encountered from within the case. Diaphragms arranged to provide an enclosed air pocket have been utilized for this purpose, but because of slack or bowing of the diaphragm encountered after installation, the functional reliability of such prior art constructions has been less than desirable. Despite recognition of the problem, a solution has not heretofore been known.

SUMMARY OF THE INVENTION

The invention relates to gauge instruments and more specifically to gauge case constructions for a liquid filled pressure gauge affording enhanced reliability of temperature compensation for induced volume changes of the liquid fill while at the same time providing pressure relief capability in the event excess overpressures are encountered.

These are achieved in accordance with the invention hereof by a back cover for the gauge case on which a diaphragm has been pretensioned in pressure tight spaced relation to inside face of the cover as to define a captured air volume therebetween. An annulus extending laterally from the cover face includes a negative draft about its circumference for receiving the pretensioned diaphragm and enables diaphragm tension to be increased in the course of positioning the diaphragm in a friction fit within the case.

It is therefore an object of the invention to define a novel temperature compensator for a fluid filled pressure gauge enabling temperature induced volumetric changes imposed on the liquid fill to be reliably compensated for.

BRIEF DESCRIPTION OF THE DRAWINGS

FIG. 1 is a sectional elevation partially exploded of a gauge casing in accordance with the invention in its pre-assembly relation;

FIG. 2 is a fragmentary sectional elevation of the gauge case of FIG. 1 in its post-assembly relation; and FIGS. 3, 4 and 5 are enlarged fragmentary sections of the encircled portion of FIG. 2 for alternate embodiments of the invention.

Referring now to FIGS. 1 and 2 of the drawings, there is illustrated a more or less typical turret-shaped gauge casing 10 formed of phenolic or polypropylene or other commercially suitable plastic composition. The casing is of a solid front construction in which an intermediate wall 12 separates a front compartment 14 from a rear compartment 16 to which fluid fill (not shown) is supplied. A plurality of bolt bosses 18 spaced around the rear periphery enable convenient mounting of the gauge in a variety of manners which are per se well known.

Contained within front compartments 14 is a dial plate 20 secured via screws 22 to the front face of wall 12. Centrally extending through a wall aperture 23 is a pointer shaft 24 supporting a pointer 26 for displacement relative to graduated pressure values contained on the dial plate. Enclosing the front compartment is a window 28 clamped pressure tight against an O-ring seal 30 by means of a threaded bezel ring 32 received within internal casing threads 34 thereat. Rear compartment 16 contains a pressure responsive element such as a Bourdon tube 36 having an inlet socket 38 for receipt of the supplied fluid for which pressure measurements are to be obtained. Socket 38 is secured as by welding to a mounting plate 40 in turn attached to wall 12 by screws 22. Via a gear movement (not shown) pointer shaft 24 is driven in response to tip travel of tube 36 in a conventional manner. Casing aperture 42 surrounding Bourdon tube socket stem 38 is sealed a compressed sponge gasket 44. An O-ring seal 45 may also be included in groove 47.

Compensating cover 48 in accordance herewith is comprised of a generally flat metal or plastic annular back plate 50 which near its periphery has an annular boss 52 extending laterally a distance Y from the inside surface of the back plate. The circumferential surface 54 of boss 52 includes a lateral inward draft of angle $\beta$ which merges at the plate surface with peripheral flange 56. Adapted for pre-tensioned mounting transversely on boss 52 is a thin elastic diaphragm 58 having increased cross-sectional thickness about its periphery 60. A small hole 62 through plate 50 affords a vent connection between the captured volume and atmosphere.

Forming the compensating cover in accordance herewith includes pre-stretching diaphragm 58 over the face of annular boss 52 until arranged in the manner illustrated in FIG. 1 leaving a lateral distance X between the edge of the diaphragm and the inside face of flange 56. The circumferential periphery 60 of the diaphragm is dimensioned as to encounter a friction fit with the inside diameter 49 of opening 46 in the course of installation. By this means, therefore, the diaphragm encounters increased tension as its edge is forced back toward contact against flange 56 eliminating or reducing the distance X to the relation illustrated in FIG. 2. This results in a drum-tight surface of diaphragm 50 with the amount of stretch tension being essentially controlled by the initial distance X along with the rightward friction force imposed on installation against the diaphragm periphery 60.

By virtue of the negative draft angle β, the sealing edge of the diaphragm in the course of installation is in effect permitted to escape into the wider part of the peripheral space at flange 56, while concomitantly enhancing the sealing thereat. Should the gauge incur vibration, the pre-stretched diaphragm will exert sufficient force to draw the sealing member 60 into the pocket area thereat. At the same time, should overpressure be encountered within the case, the cover being only friction held in place can conveniently be blown out in the manner shown in phantom in FIG. 2.

Referring now to FIGS. 3–5, there is illustrated alternate constructions for cover plate 50 which in FIG. 3 includes a frusto-conical annulus rib 64 having negative draft angle β replacing boss 52 of the previous embodiment. A plurality of radial stiffening ribs 66 are included to reinforce boss 52. In FIG. 4, rib 64 is conically convex on its circumference, and in FIG. 5 is conically concave on its circumference.

By the above description there is disclosed a novel cover construction for a liquid filled gauge able to readily accommodate temperature induced volumetric changes within the gauge casing. By virtue of the pre-stretch tension applied to diaphragm 58 in combination with the negative circumferential draft contained on the annulus support 52, the diaphragm is continuously tensioned for maintaining an air space of predetermined volume between the diaphragm and cover plate 50. When fluid within the case encounters temperature induced expansion, the expansion is accommodated by the diaphragm being displaced toward the back plate 50. Since the diaphragm is tensioned, the previous problems associated with slack or bowing incurred with prior art constructions is overcome in a simple but functionally effective manner to assure its reliability when the need arises.

Since many changes could be made in the above construction, and many apparently widely different embodiments of this invention could be made without departing from the scope thereof, it is intended that all matter contained in the drawings and specification shall be interpreted as illustrative and not in a limiting sense.

The embodiments of the invention in which an exclusive property or privilege is claimed are defined as follows:

1. In a fluid filled pressure gauge including a condition responsive element operative to produce displacement in response to exposed condition changes to which it is sensitive, output means operably connected to said condition responsive element for reflecting the displacement position thereof; a gauge case housing said condition responsive element and said output means and having an internal volume adapted to contain the fluid fill; and compensator means for offsetting temperature induced expansion of the fluid fill, the improvement in said compensator means comprising:
    (a) a cover plate adapted to be received in an opening defined in the rear of said case;
    (b) an annulus extending laterally away from the inside face of said cover plate and having a negative draft contained on its circumferential surface extending from the distal end of the annulus toward the inside face of said cover plate; and
    (c) a diaphragm mounted transversely in tension relation folded over said annulus onto the circumference surface thereof to define an enclosed space contained between said cover plate, said diaphragm and said annulus, the outside diameter of the diaphragm on said circumference being sized to provide a friction fit with the inside diameter surface of said coverplate opening for securing said cover plate in said case.

2. In a fluid filled pressure gauge including a condition responsive element operative to produce displacement in response to exposed condition changes to which it is sensitive, output means operably connected to said condition responsive element for reflecting the displacement position thereof; a gauge case housing said condition responsive element and said output means and having an internal volume adapted to contain the fluid fill; and compensator means for offsetting temperature induced expansion of the fluid fill, the improvement in said compensator means comprising:
    (a) a cover plate adapted to be received in an opening defined in the rear of said case;
    (b) an annulus extending laterally away from the inside face of said cover plate and having a negative draft contained on its circumferential surface extending from the distal end of the annulus toward the inside face of said cover plate; and
    (c) a diaphragm mounted transversely in tension relation over said annulus onto the circumference surface thereof to define an enclosed space contained between said cover plate, said diaphragm and said annulus, and having a periphery folded onto the circumferential surface of said annulus to effect said tension relation with an outside diameter sized to provide a friction fit with the inside diameter of said cover plate opening in said case, said diaphragm periphery terminating on said circumferential surface at an edge with a predetermined spacing from the inside cover face surface thereat when unassembled to said case for being adapted to incur displacement toward said cover face in the course of assembly to said case to increase said tension relation.

3. In a fluid filled pressure gauge according to claims 1 or 2 in which said rear case opening for receipt of said cover plate comprises the internal wall surface of said gauge case housing.

4. In a fluid filled pressure gauge according to claims 1 or 2 in which said negative draft on said annulus in cooperation with the inside diameter of said cover plate case opening defines an area therebetween of increasing cross-section extending from the distal end of said annulus toward the inside face of said cover plate.

5. In a fluid filled pressure gauge according to claim 4 in which said compensator means is secured in said rear case opening by said friction fit, and said fit is responsive to a predetermined value of overpressure within said housing to enable rearward separation of the compensator means from said case for affording relief of the overpressure.

* * * * *

UNITED STATES PATENT AND TRADEMARK OFFICE
CERTIFICATE OF CORRECTION

PATENT NO. : 4,501,152            Page 1 of 3

DATED : February 26, 1985

INVENTOR(S) : Richard H. Wetterhorn et al.

It is certified that error appears in the above-identified patent and that said Letters Patent is hereby corrected as shown below:

The title page should be cancelled to appear as per attached title page.

The sheet of drawing containing Figures 1, 2, 3, 4 and 5 should be cancelled to appear as per attached sheet.

Signed and Sealed this

Twenty-fifth Day of June 1985

[SEAL]

Attest:

DONALD J. QUIGG

Attesting Officer      Acting Commissioner of Patents and Trademarks

United States Patent [19]

Wetterhorn et al.

[11] Patent Number: 4,501,152
[45] Date of Patent: Feb. 26, 1985

[54] TEMPERATURE COMPENSATOR FOR LIQUID FILLED PRESSURE GAUGE

[75] Inventors: Richard H. Wetterhorn, Fairfield; Walter J. Ferguson, Middlebury, both of Conn.

[73] Assignee: Dresser Industries, Inc., Dallas, Tex.

[21] Appl. No.: 473,829

[22] Filed: Mar. 9, 1983

[51] Int. Cl.³ .................... G01L 19/14; G01P 1/02
[52] U.S. Cl. .................................... 73/738; 73/431
[58] Field of Search .............. 73/738, 708, 300, 715, 73/706, 431; 92/98 R, 98 D

[56] References Cited

U.S. PATENT DOCUMENTS

| | | | |
|---|---|---|---|
| 2,693,896 | 11/1954 | Brown | 220/44 |
| 3,938,393 | 2/1976 | Mogensen et al. | 73/431 |
| 4,051,730 | 10/1977 | Andrews et al. | 73/738 |

FOREIGN PATENT DOCUMENTS 2249266  4/1974  Fed. Rep. of Germany .

OTHER PUBLICATIONS

Manning, Maxwell & Moore Dwg., 56C117, 1965-Item #28.
Dresser Industries, Inc., Dwg. WJF-004-Wika Gauge Construction Model 233.33, 1982-FIGS. 1 and 3.

Primary Examiner—Donald * Woodiel
Attorney, Agent, or Firm—Daniel Rubin

[57] ABSTRACT

A liquid filled pressure gauge in which temperature induced volumetric changes imposed on the liquid fill are compensated for by a tensioned flexible diaphragm secured in a pressure-tight spaced relation on a cover plate for the gauge casing. For receiving the diaphragm pre-tensioned, the cover includes an annulus extending laterally from the cover surface with a negative draft on its circumference. By virtue of the diametral relationship between the outside diameter of the diaphragm about the draft surface of the annulus and the internal diameter of the case opening, the diaphragm incurs a friction fit as the cover is emplaced causing diaphragm tension to be increased.

5 Claims, 5 Drawing Figures

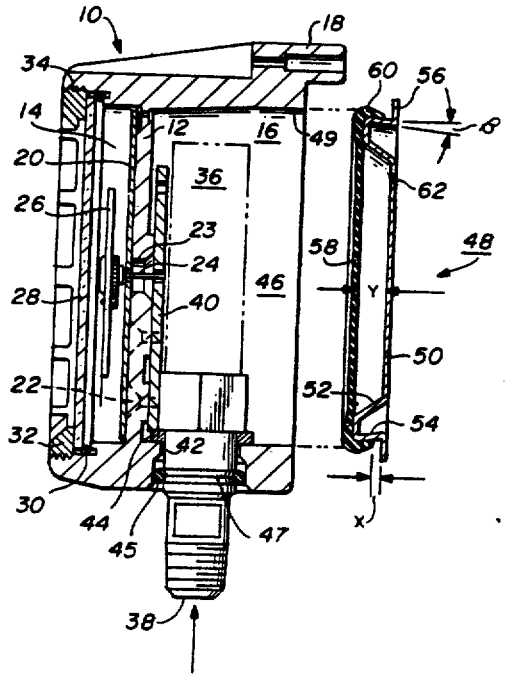

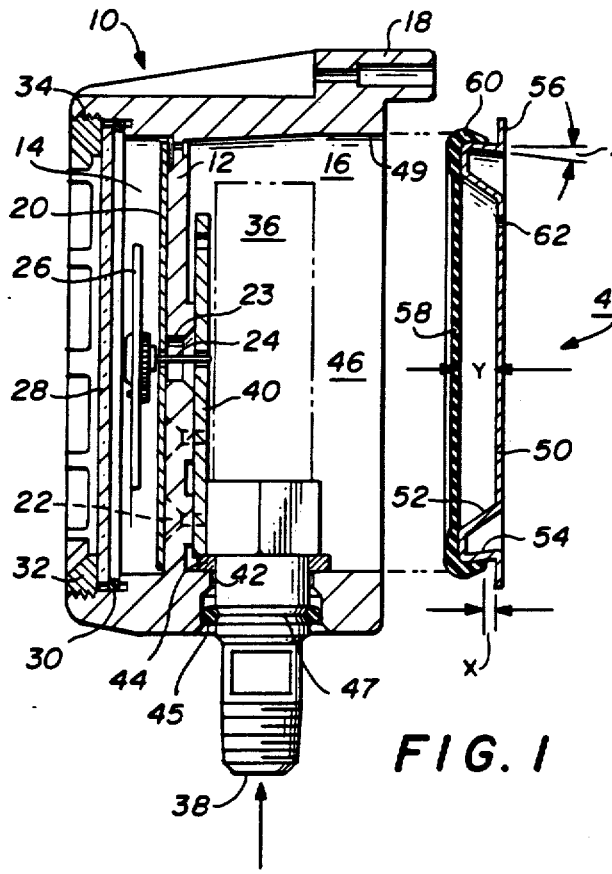
FIG. 1
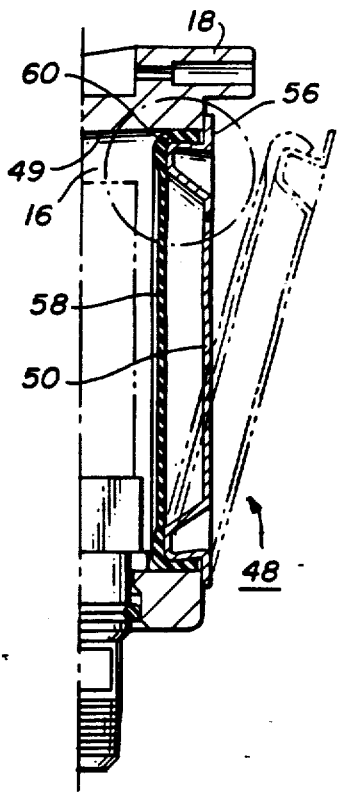
FIG. 2
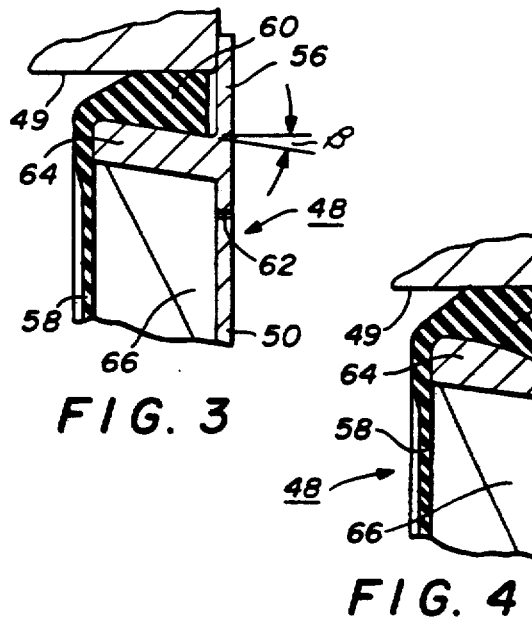
FIG. 3
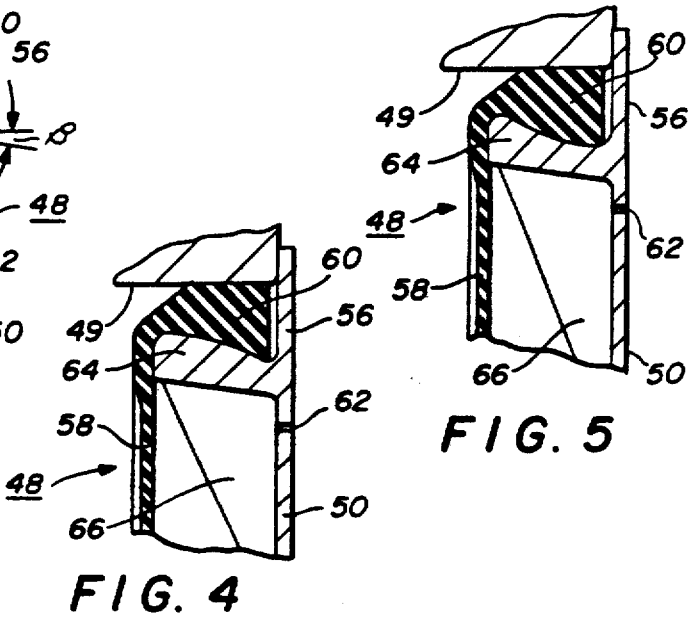
FIG. 4
FIG. 5